United States Patent [19]

Wohlfahrt et al.

[11] Patent Number: 5,524,747
[45] Date of Patent: Jun. 11, 1996

[54] METHOD AND APPARATUS FOR TAKING UP ARTICLES

[75] Inventors: Andreas Wohlfahrt, Haltern, Germany; Anders G. P. Ingelhag, Göteborg, Sweden

[73] Assignee: Digitron AG, Aarau, Switzerland

[21] Appl. No.: 251,952

[22] Filed: May 31, 1994

[30] Foreign Application Priority Data

Jun. 1, 1993 [CH] Switzerland .......................... 01620/93

[51] Int. Cl.⁶ .................................................. B65G 65/02
[52] U.S. Cl. ........................................ 198/512; 414/528
[58] Field of Search ............................. 414/797.2, 797.3, 414/796, 278, 528; 198/512

[56] References Cited

U.S. PATENT DOCUMENTS

| 3,070,241 | 12/1962 | Johnston . | |
|---|---|---|---|
| 3,749,257 | 7/1973 | Yamashita . | |
| 3,866,765 | 2/1975 | Stobb | 414/797.2 |
| 4,119,219 | 10/1978 | Marschke | 414/796 |
| 4,219,294 | 8/1980 | Capdeboscq | 414/796 |
| 5,028,201 | 7/1991 | Hawthorne | 414/796 |
| 5,205,703 | 4/1993 | Shill et al. | 414/796 |
| 5,222,857 | 6/1993 | Hasegawa . | |
| 5,238,350 | 8/1993 | Krieg . | |
| 5,265,712 | 11/1993 | Krieg . | |

FOREIGN PATENT DOCUMENTS

| 0462518 | 6/1991 | European Pat. Off. . | |
|---|---|---|---|
| 2313294 | 12/1976 | France | 414/796 |
| 2318089 | 2/1977 | France . | |
| 1907109 | 9/1970 | Germany . | |
| 3733461 | 4/1989 | Germany . | |
| 4218468 | 12/1992 | Germany . | |
| 63-277142 | 11/1988 | Japan | 414/796 |
| 4-303330 | 3/1991 | Japan | 414/797.3 |
| 1276070 | 6/1972 | United Kingdom . | |
| 1559973 | 1/1980 | United Kingdom . | |

*Primary Examiner*—William E. Terrell
*Assistant Examiner*—Douglas A. Hess
*Attorney, Agent, or Firm*—Greenblum & Bernstein

[57] ABSTRACT

Method and apparatus for taking up articles wherein the apparatus includes a receiving table with conveyor belts, an auxiliary member located thereabove and a holding assembly located above the article, wherein, for taking up the article, a pressing member of the holding assembly is pressed onto a rearward part of the article from above, and the auxiliary member is pressed against its upper front face, whereupon the auxiliary member is moved upwardly while still pressing against the article, thereby tilting the article about an axis located close to its upper rear edge, thus displacing the receiving table into the gap opening below the article and loading same onto its conveyor belts. The method allows the take up of package-shaped rigid articles, without requiring additional room behind the article and is especially suited for successively handling a plurality of articles located behind each other.

11 Claims, 4 Drawing Sheets

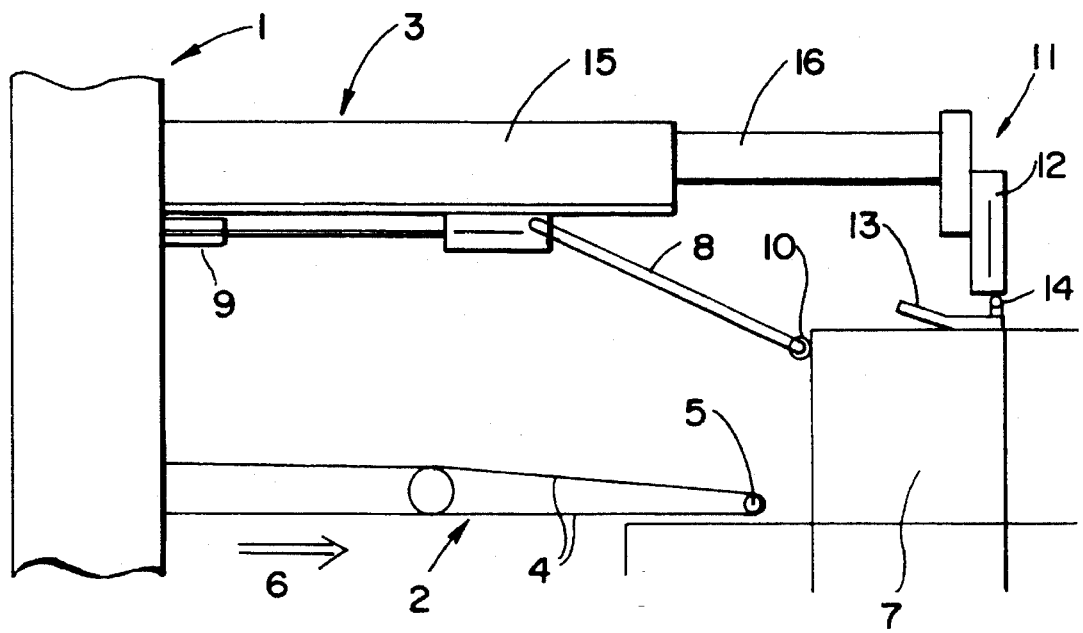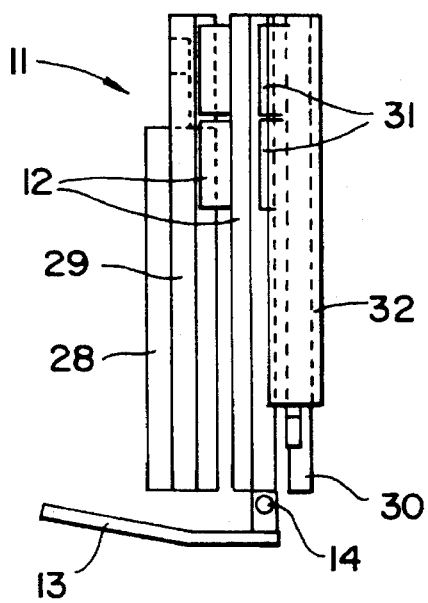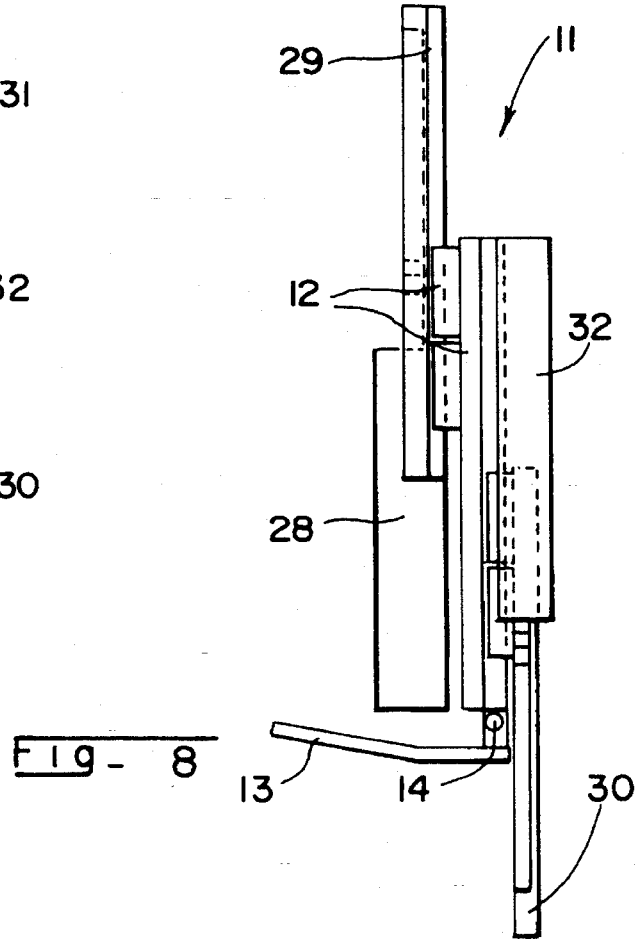

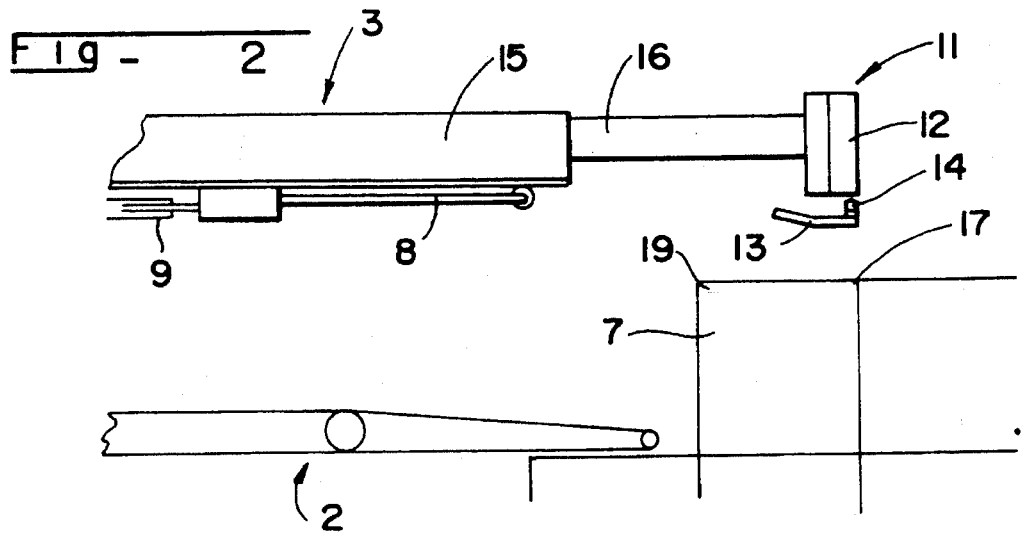
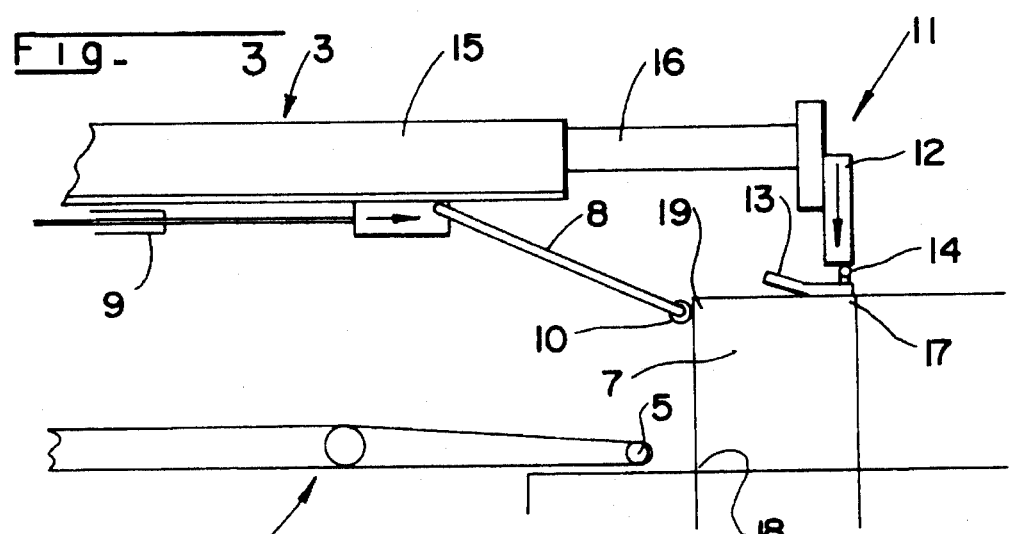
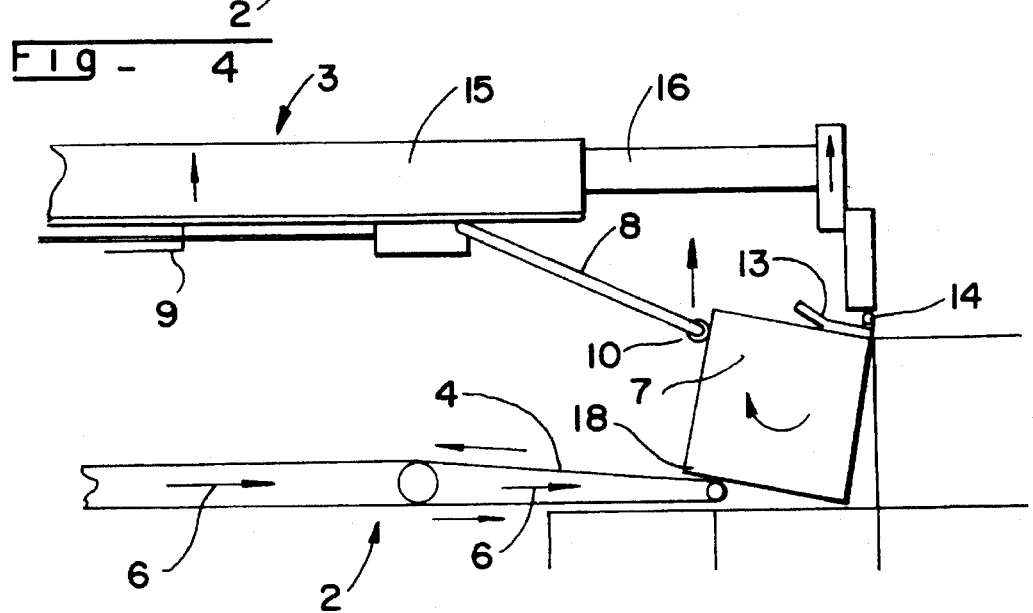

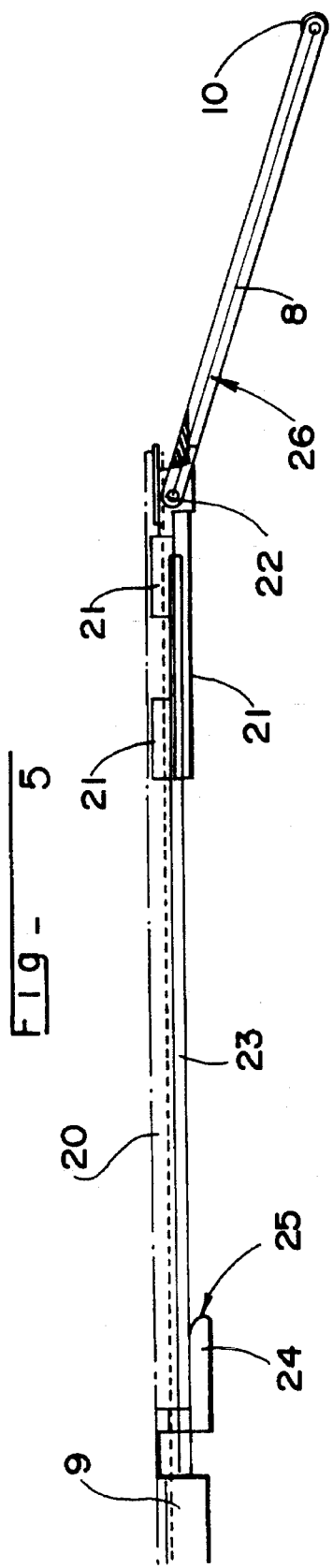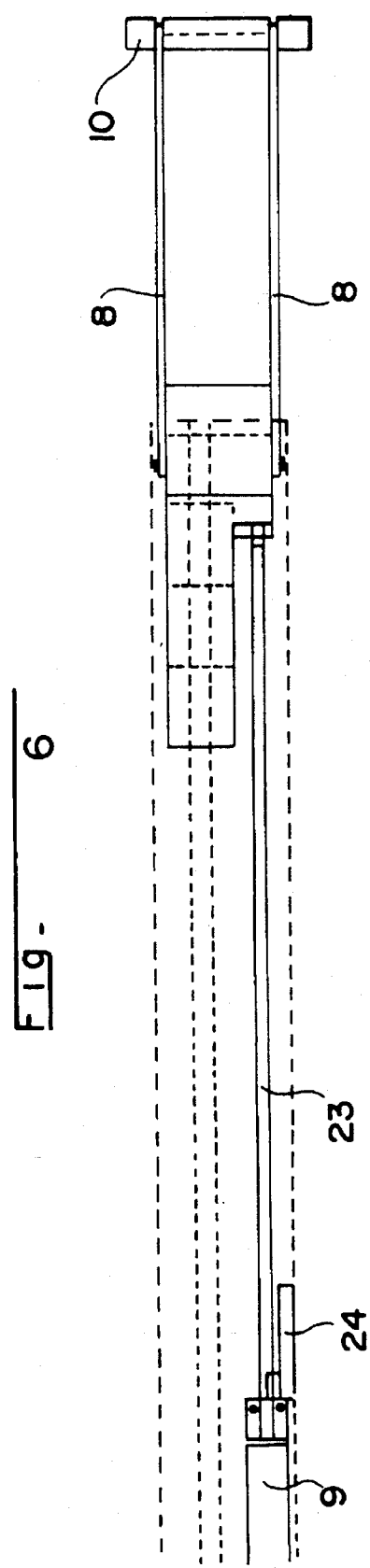

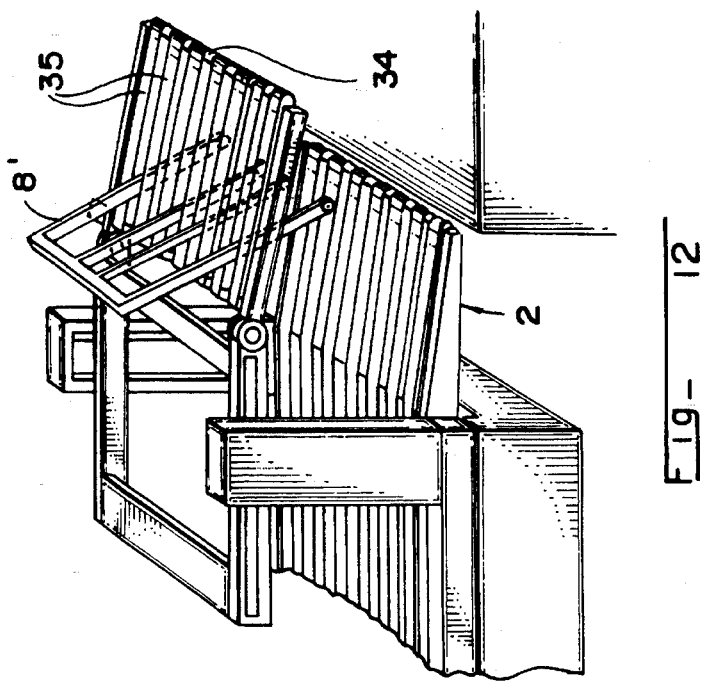
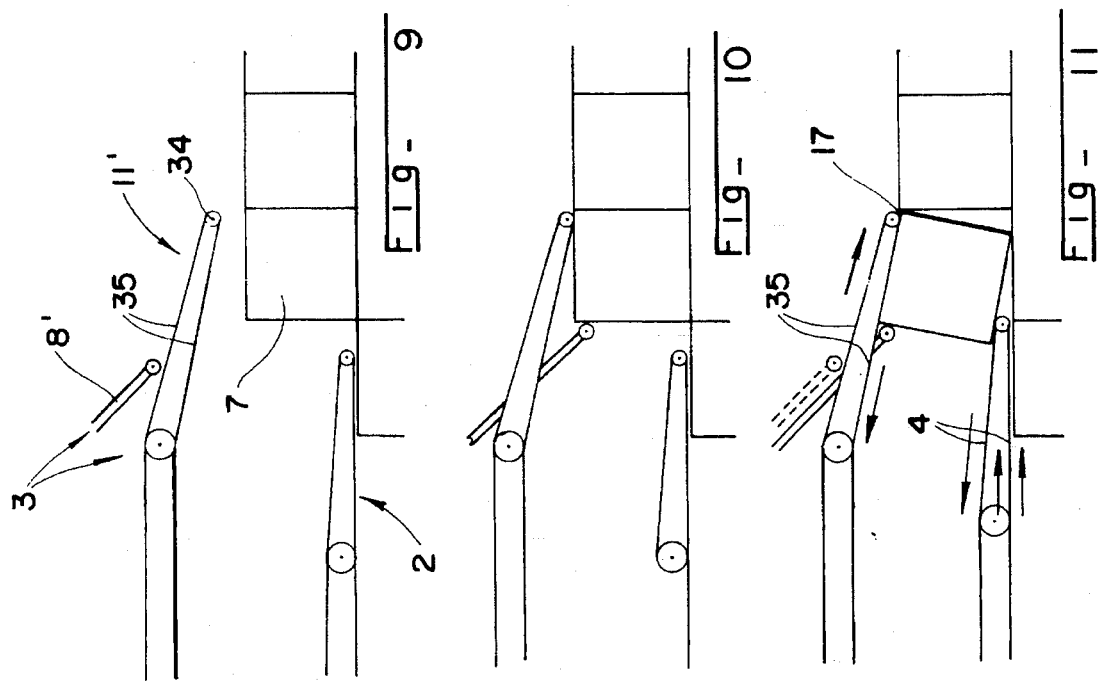

METHOD AND APPARATUS FOR TAKING UP ARTICLES

CROSS REFERENCE TO RELATED APPLICATIONS

This application claims the priority of Swiss Application No. 1620/93-8, filed Jun. 1, 1993, the disclosure of which is incorporated herein by reference in its entirety.

BACKGROUND OF THE INVENTION

1. Field of the Invention

The invention relates to an apparatus for taking up articles by means of a receiving table, which receiving table is displaceable towards said article. The invention also relates to a method for taking up articles by using such an apparatus.

2. Discussion of the Background of the Invention and Material Information

Devices for taking up articles automatically are preferably used in automated warehouses. In such warehouses various kind of articles can be stored, and an apparatus should be capable of taking up all of these articles quickly and securely, e.g. for transferring them onto a vehicle for the loading and unloading of shelves.

A known prior art apparatus, described in U.S. Pat. No. 5,265,712, comprises a receiving table, which can be displaced towards the article to be taken up. On its front end, this table is provided with rollers, which are driven by a conveyor belt. When they come into contact with the article, the rollers or the conveyor belt, respectively, exert an upward frictional force on the article, which lifts the article at its front end. This lifting movement can be supported by lowering an auxiliary pickup member, from above, onto the article. This auxiliary pickup member exerts a force on the top side of the article which is directed away from the apparatus, thereby supporting the lifting movement by its torque. Once the front end of the article has been lifted, the receiving table is moved into the gap opening below the article. The conveyor is then operated with a velocity that is equal but opposite to the velocity of the receiving table. In this way, the article is loaded onto the receiving table without being displaced horizontally. A similar prior art device is described in U.S. Pat. No. 3,070,241.

The previously described method is not suited for all kinds of articles. Problems occur, e.g. with package-like articles that are comparatively stiff. If such an article is lifted with the method described above, it is tilted about its lower rear edge, facing away from the apparatus. If a plurality of such articles are stored closely behind each other, or if an article is located with its back against a wall, this tilting movement is obstructed because the article comes into contact with the next article or the wall behind it.

Another prior art device for taking up articles is described in German Patent Publication DE 1,907,109. Here, the receiving table is provided with a lever, which is hooked into a recess in the article and pulls the article onto the receiving table. This device is, however, only suited for articles provided with a suitable recess. Furthermore, the articles are also tilted about their lower rear edge, which makes this device unsuitable for taking up articles located closely behind each other.

Prior art European Patent Publication, EP 462 518 and corresponding U.S. Pat. No. 5,238,350 disclose a further device, which is provided with an auxiliary tilting device which is pushed against the article for tilting same. In this way, the article is tilted about its lower rear edge, which—as mentioned above—makes it impossible to take up articles located closely behind each other.

SUMMARY OF THE INVENTION

It is a general object of the invention to provide an apparatus and a method of this kind that circumvents at least some of the previously-described problems. In particular, it should also be suited for stiff articles located closely behind each other and it should make it possible to take them up securely and quickly.

In order to implement these and still further objects of the invention, which will become more readily apparent as the description proceeds, the method for taking up an article by means of an apparatus including a receiving table, which receiving table is displaceable in a direction of displacement towards said article, is manifested by the features that it comprises the steps of displacing an auxiliary member of the apparatus towards the article and bringing the auxiliary member into contact with a forward upper part of the article, then exerting a force with an upward vertical component to the article by means of the auxiliary member and tilting the article about a horizontal tilting axis, with the tilting axis being located in a rearward, upper area of the article, such that a bottom portion of the article is lifted in a forward part of the article, and then displacing the receiving table at least partially below the article for taking up the article.

In another embodiment of the method of this invention, during tilting of the article, a horizontal displacement of the article, away from the apparatus, is substantially prevented by an object located behind the article.

In a further embodiment of the method of this invention, during tilting of the article, a horizontal displacement of the article, away from the apparatus, is substantially prevented by placing a stopper member behind the article.

In an additional embodiment of the method of this invention, during tilting of the article, a pressing member is abutting the article on an upper, rearward part of the article.

In the embodiment of the method of this invention wherein the pressing member exerts a downward force on the article and wherein the properties of at least one of the following namely, a surface of the pressing member, a surface of the article coming into contact with the pressing member, a bottom surface of the article, and a surface supporting the article, as well as the downward force and the weight of the article, are chosen such that a maximum horizontal frictional force between the article and the pressing member is larger than a maximum horizontal frictional force between the article and the surface supporting the article.

In yet another embodiment of the method of this invention a tilting joint is provided in the pressing member, the tilting joint acting as the tilting axis.

In yet a further embodiment of the method of this invention, during tilting the article, the pressing member is pressed against the article with a substantially constant force.

In still an additional embodiment of the method of this invention, during tilting the article, the auxiliary member is pressed against the article with a substantially constant force.

The apparatus for taking up an article is manifested by the features that it comprises a receiving table displaceable in a direction of displacement, and an auxiliary member, located above the receiving table, displaceable into the direction of displacement and providing means for exerting a force with an upward vertical component.

In another embodiment of the apparatus of this invention, the auxiliary member is displaceable in a vertical direction.

A further embodiment of the apparatus of this invention includes means for pressing the auxiliary member with a substantially constant force into the direction of displacement.

An additional embodiment of the apparatus of this invention includes a holding assembly, the holding assembly being displaceable towards the article from above the article.

Preferably, the holding assembly includes pressing means for contacting the article, the pressing means being tiltable about a horizontal tilting axis.

In another construction the holding assembly includes a stopper, the stopper being extendable in a vertical direction, and being placeable behind the article.

A yet further embodiment of the apparatus of this invention includes means for pressing the holding assembly with a substantially constant vertical force onto the article.

In yet a further construction, the holding assembly and the auxiliary member are driven, by a common drive, for vertical displacement.

In a final embodiment of the apparatus of this invention the receiving table comprises a conveyor mechanism for the article.

Since the article is tilted about a tilting axis that is located close to its upper rear edge, such that its lower front edge is moving forwardly towards the apparatus and upwardly, no additional space is required behind the article. Therefore, the method is also suited for situations where a plurality of stiff or rigid articles are positioned closely behind each other. By means of tilting movement the forward bottom edge is lifted such that the receiving table can be displaced into the gap opening below the article.

The required movement of the article is made possible by exerting a force with an upward vertical component onto a forward upper part of the article. At the same time, the article is preferably supported such that it cannot yield in a backward direction. The support can e.g. be implemented by a second article located behind the article or by a stopper member brought into position behind the article.

It is also possible to prevent the article from yielding backwardly by lowering a pressing member, from above, onto the article. The downward force of this pressing member is preferably adjusted such that the maximum frictional force between the pressing member and the article is larger than the maximum frictional force between the article and the support.

The apparatus according to the invention includes an auxiliary member suited for exerting the vertical force onto the forward upper part of the article. For this purpose, the auxiliary member can e.g. be designed to be pressed against the article and then be displaced upwardly.

Preferably, the apparatus is further provided with a holding assembly that can be lowered, from above, onto a rear part of the upper surface of the article and includes a pressing member which is pressed onto the article. For facilitating the tilting movement, the pressing member can include a tiltable joint.

Furthermore, a stopping member can be mounted on the holding assembly, which stopping member can be extended downwardly and brought into a position behind the article. This can prevent the article from yielding in a backward direction.

By using the inventive method and apparatus, it becomes possible to take up stiff, package-like articles, even if several of them are arranged behind each other.

It is also possible to modify an existing apparatus to utilize the inventive features to turn it into a device that is capable of picking up a large variety of articles.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein:

FIG. 1 shows side view of a preferred embodiment of the invention;

FIG. 2 shows a first phase of taking up the article;

FIG. 3 shows a second phase of taking up the article;

FIG. 4 shows a third phase of taking up the article;

FIG. 5 is side view of the auxiliary member;

FIG. 6 is a top view of the auxiliary member;

FIG. 7 shows the holding assembly in its upper position;

FIG. 8 shows the holding assembly in its lower position;

FIG. 9 shows a second preferred embodiment of the invention in a first phase of taking up the article;

FIG. 10 is the embodiment of FIG. 9 during a second phase of taking up the article;

FIG. 11 is the embodiment of FIG. 9 during a third phase of taking up the article; and FIG. 12 is a schematic perspective view of the embodiment of FIGS. 9–11.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

FIG. 1 is a side view of a first preferred embodiment of the invention. The apparatus shown here is part of a vehicle 1 for loading and unloading articles in shelves, such as it is, e.g., installed in an alley of a warehouse. The apparatus is basically comprised of a receiving table 2 and an auxiliary member or pickup assembly 3.

The receiving table 2 can be displaced horizontally along a direction of displacement 6 towards the article 7 to be picked up and is provided with a conveyor assembly for articles located thereon. This conveyor assembly comprises one or more conveyor belts 4, which run over a guiding or receiving roller 5, which can be driven in both directions.

The auxiliary pickup assembly 3 comprises an auxiliary or positioning member 8 which can also be extended along direction 6 by means of a preferably pneumatic drive 9. The distal end 10 of the auxiliary member 8 is covered by a rubber material to provide a good frictional contact with the article 7. Auxiliary member 8 is an actuator for exerting a force with an upward vertical component to an upper part of the front face of the article 7.

The auxiliary pickup assembly 3 further comprises a holding assembly 11, with holding assembly 11 being mounted on or attached to a telescopic arm 15, 16. Mounted on or attached to a preferably pneumatically driven, vertically displaceable sled 12 of the holding assembly 11 is a pressing member 13, which is connected to the sled 12 by means of a joint 14. Joint 14 allows a tilting of the pressing member 13 in relation to the sled 12 about a horizontal tilting axis extending perpendicularly to the direction of displacement 6.

Before further constructive details of the apparatus are discussed, its method of operation will be illustrated with reference to FIGS. 2–4.

Initially, the apparatus is positioned in front of the article 7 to be taken up. The height of the receiving table 2 and the auxiliary member 8 are adjusted in a manner so that the distal end 10 of the auxiliary member 8, in its extended position, is located slightly below the upper front edge 19 of article 7 while the roller 5 of the receiving table 2 is located slightly above the lower front edge 18 of article 7 (FIG. 3).

Then, the telescopic arm 15 with the holding assembly 11 is extended into the position shown in FIG. 2. This position is controlled by a computer and chosen according to the position of the article 7 to be taken up. The pressing member 13 is now located approximately 80 mm above the upper edge 17 of the article.

Thereafter, the pneumatic drive of the sled 12 is activated and the pressing member 13 is lowered onto the upper surface of article 7. There it pushes downwardly with a given, constant force (see FIG. 3). At the same time, the pneumatic drive 9 of the auxiliary member 8 is driven with a defined pressure and the auxiliary member 8 is extended horizontally. During this movement, auxiliary member 8 is tilted from its upper position, shown in FIG. 2, to a slanted, lower position, shown in FIG. 3. This movement is caused by a special guiding mechanism to be described hereinafter. The auxiliary member 8 is moved towards the article 7 by means of pneumatic drive 9 until the distal end 10 of auxiliary member 8 pushes with a given constant force against article 7.

Now, as shown in FIG. 4, the auxiliary pickup assembly 3 is lifted, together with the auxiliary member 8 and its distal end 10 by e.g. 60mm, whereby the vertical pressing force of the pressing member 13 and the horizontal pressing force of the auxiliary member 8, onto the article, remain constant, thereby tilting article 7. The tilting movement occurs substantially about the axis of the joint 14, which is located in an rearward upper area of the article 7 close to its upper rear edge 17. Therefore, the tilting axis substantially coincides with the upper rear edge 17 of article 7. Thereby, the lower front edge 18 of article 7 is moved upwardly, such that a gap is opened below article 7. The receiving table 2 is displaced so as to enter this gap. Synchronously with the velocity of displacement of the receiving table 2, the conveyor belt 4 is operated in the opposite direction such that article 7 is loaded onto the table 2 without being displaced in a horizontal direction. Then, even before the table 2 is completely below the article 7, the auxiliary member 8 is retracted and the taking up procedure is completed in a conventional manner.

The taking up procedure will yet be discussed further at the end of this description. First, some preferred constructive features of the apparatus will now be described, which facilitate the procedure discussed with reference to FIG. 2–4.

FIGS. 5 and 6 show a detailed view of the auxiliary member 8 and its guiding mechanism. A sled 21 runs in a guide rail 20 attached to the telescopic arm 15, with auxiliary member 8 being connected to a rod 23 by means of a joint 22. Rod 23 is axially driven by pneumatic cylinder 9. Joint 22 allows the auxiliary member 8 to be tilted onto the slanted position shown in FIG. 5. In the fully extended position shown in FIG. 5, auxiliary member 8 is always in this particular position. When auxiliary member 8 is pulled back, its lower face or surface 26 abuts onto a rounded edge 25 of a stopper 24 and is urged upwardly into the horizontal position shown in FIG. 2.

FIGS. 7 and 8 show the holding assembly 11 in its retracted and extended positions, respectively. As it has been described previously, the pressing member 13 is connected to the vertically displaceable sled 12 via a tiltable joint 14. The sled 12 can be displaced on a rail 29 by means of a pneumatic drive 28 with a regulated pressing force, with rail 29 being mounted on telescopic arm portion 16.

Furthermore, the holding assembly 11 of this preferred embodiment is provided with a stopper member 30, which is connected via guides 31 with the sled 12 of pressing member 13 and which can be extended in a downward direction by means of a linear pneumatic drive 32.

Stopping member 30 is especially useful when the last article in a row is to be taken up. It is lowered behind the article and prevents it from yielding in a backward direction under the pressure of the auxiliary member 8, 10.

A second preferred embodiment, with a modified design of the auxiliary pickup assembly 3, is shown in FIGS. 9–12. Here the holding assembly 11' comprises an upper roller 34 for guiding a plurality of parallel conveyor belts 35, similar to those of the table 2 (FIG. 12). For taking up article 7, the end of the holding assembly 11' is lowered onto the rearward end of the top surface of article 7 while the conveyor belts 35 are standing still (FIGS. 9, 10). At the same time, the auxiliary member 8' is moved downwardly through the conveyor belts 35, is pressed against the front face of article 7, and is moved upwardly. Thereby, article 7 is tilted about its upper rear edge 17 and the table 2 can be driven into the gap below it (FIG. 11). Then, auxiliary member 8' is retracted to its initial position as shown in the dashed lines in FIG. 11. For guiding the article during the pickup procedure, the conveyor belts 4 and 35 can now be driven along the directions indicated by the arrows in FIG. 11.

In the perspective view of FIG. 12 it is illustrated how the auxiliary member 8' can reach with four arms through or between the conveyor belts 35 in order to be pressed against article 7. The design of suitable guiding and driving mechanisms of the auxiliary member 8' is well known to a person skilled in the art and has therefore been omitted from this figure.

For extending the capabilities of the holding assembly 11', it can further be provided with one or more stopper members that can be lowered or swivelled into a position behind the article and implement the function of the stopper member 30 of FIG. 8.

The preferred embodiments of the apparatus described so far can be operated by several methods. They can e.g. be operated by conventional methods where the auxiliary member 8, 8' is not used. In this case, the roller 5 of the receiving table 2 is pressed against the article and rotated. The frictional force generated in this way can lift the front part of article 7 such that receiving table 2 can enter the gap below it. When this method is used with stiff articles, they are tilted about the lower rear edge. This tilting movement can further be supported by pressing the holding assembly 11, 11' onto the article and exerting a force along the direction of displacement 6, thereby generating an additional torque.

In the inventive method the article is, however, not tilted about its lower rear edge, but it is tilted about a tilting axis lying close to its upper rear edge 17. In order to generate such a tilting movement, the auxiliary member 3 must be used. This member contacts the article in an upper region (e.g. an upper half) of the front face of article 7, where it exerts a force having a vertical component that is directed upwardly. In this manner, a tilting movement, as shown in FIGS. 4 and 11, is generated. During this procedure, the following two conditions should preferably be fulfilled:

(1) The pressing force of the auxiliary member 8 is selected such that the maximum frictional force between the rubber covered distal end 10 thereof and article 7 is larger than or comparable to the weight of article 7; and
(2) The pressing force of holding assembly 11, 11' onto article 7 is selected such that the maximum frictional force between the rubber covered pressing member 13 and the surface of article 7 is larger than the maximum frictional force between article 7 and the surface it is standing on.

Condition (2) need not be satisfied if the article is prevented in any other way from yielding backward (i.e. along the direction of displacement 6). For this purpose it is e.g. possible to use the stopper plate 30 of holding assembly 11. A yielding of the article can, however, also be prevented by the next adjacent article located behind it. If this next article is not heavy enough to withstand the pressure of the article to be picked up, it can also be held by holding assembly 11 (by pressing it down with pressing member 13 and/or by supporting it by stopper member 30).

Holding assembly 11, 11' can therefore be used in various ways. In particular, it can hold the article to be picked up by means of the pressing member 13. Alternatively, or in addition thereto, it can use the stopper member 30. The holding assembly can also hold an article located behind the article to be picked up. Often, the article can also be picked up without using the holding assembly, especially when the article is prevented from yielding by other means.

As shown in FIG. 11, the holding assembly can also be used to guide the article after tilting.

The optimum method to be used in a given situation can be selected by a computer from several, pre-programmed alternatives depending on the article to be taken up and its position.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A method for taking up a single article by means of an apparatus including a receiving table, which receiving table is displaceable in a direction of displacement towards said article, said method comprising the steps of:

displacing an auxiliary member of said apparatus towards said article and bringing said auxiliary member into contact with a forward, upper part of said article;

exerting a force with an upward vertical component onto said article by means of said auxiliary member and tilting said article about a horizontal tilting axis, said tilting axis being located in a rearward, upper area of said article, such that a bottom portion of said article is lifted in a forward part of said article; and displacing said receiving table at least partially below said article for taking up said article.

2. The method of claim 1 wherein, during the tilting of said article, a horizontal displacement of said article, away from said apparatus, is substantially prevented by an object located behind said article.

3. The method of claim 1 wherein, during the tilting of said article, a horizontal displacement of said article, away from said apparatus, is substantially prevented by placing a stopper member behind said article.

4. The method of claim 1 wherein, during the tilting of said article, a pressing member is abutting said article on an upper, rearward part of said article.

5. The method of claim 4 wherein said pressing member exerts a downward force on said article and wherein properties of at least one of the following, namely, a surface of said pressing member, a surface of said article coming into contact with said pressing member, a bottom surface of said article, and a surface supporting said article, as well as said downward force and the weight of said article, are chosen such that a maximum horizontal frictional force between said article and said pressing member is larger than a maximum horizontal frictional force between said article and said surface supporting said article.

6. The method of claim 4 further including a tilting joint, wherein said tilting joint is provided in said pressing member, said tilting joint acting as said tilting axis.

7. The method of claim 4 wherein, during the tilting of said article, said pressing member is pressed against said article with a substantially constant force.

8. The method of claim 1 wherein, during the tilting of said article, said auxiliary member is pressed against said article with a substantially constant force.

9. An apparatus for taking up an article comprising:

a receiving table displaceable in a direction of displacement;

an auxiliary member displaceable into said direction of displacement and comprising means for exerting a force with an upward vertical component on said article;

wherein said receiving table and said auxiliary member are situated on one side of said article, with at least a part of said auxiliary member being located vertically above said receiving table; and a holding assembly, said holding assembly being displaceable towards said article from above said article;

wherein said holding assembly comprises pressing means for contacting said article, said pressing means being tiltable about a horizontal tilting axis.

10. An apparatus for taking up an article comprising:

a receiving table displaceable in a direction of displacement;

an auxiliary member displaceable into said direction of displacement and comprising means for exerting a force with an upward vertical component on said article;

wherein said receiving table and said auxiliary member are situated on one side of said article, with at least a part of said auxiliary member being located vertically above said receiving table; and a holding assembly, said holding assembly being displaceable towards said article from above said article;

wherein said holding assembly comprises a stopper, said stopper being extendable in a vertical direction, and being placeable behind said article.

11. An apparatus for taking up an article comprising:

a receiving table displaceable in a direction of displacement;

an auxiliary member displaceable into said direction of displacement and comprising means for exerting a force with an upward vertical component on said article;

wherein said receiving table and said auxiliary member are situated on one side of said article, with at least a part of said auxiliary member being located vertically above said receiving table; and a holding assembly, said holding assembly being displaceable towards said article from above said article;

wherein said holding assembly and said auxiliary member are driven, by a common drive, for vertical displacement.

* * * * *